United States Patent
Abe et al.

(10) Patent No.: US 7,051,575 B2
(45) Date of Patent: May 30, 2006

(54) CONTROL DEVICE FOR INTERNAL COMBUSTION ENGINE

(75) Inventors: Minoru Abe, Tokyo (JP); Manabu Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/098,434

(22) Filed: Apr. 5, 2005

(65) Prior Publication Data
US 2005/0252488 A1    Nov. 17, 2005

(30) Foreign Application Priority Data
May 14, 2004    (JP)    ............................ P2004-144626

(51) Int. Cl.
*G01L 23/22*    (2006.01)
(52) U.S. Cl. ..................................... 73/35.07; 73/35.01
(58) Field of Classification Search ............... 73/35.01, 73/35.03, 35.04, 35.05, 35.06, 35.07, 35.08, 73/35.09, 35.12, 116, 117.2, 117.3, 118.1
See application file for complete search history.

(56) References Cited

U.S. PATENT DOCUMENTS

| | | | | |
|---|---|---|---|---|
| 5,900,536 | A * | 5/1999 | Mogi et al. ................. | 73/35.08 |
| 6,520,149 | B1 * | 2/2003 | Kokubo et al. ......... | 123/406.37 |
| 6,529,817 | B1 * | 3/2003 | Torno et al. ................. | 341/155 |
| 6,750,798 | B1 * | 6/2004 | Honda ........................ | 341/155 |
| 6,947,829 | B1 * | 9/2005 | Honda ........................ | 701/111 |
| 2002/0050270 | A1 * | 5/2002 | Sauler et al. ........... | 123/406.16 |
| 2004/0030486 | A1 * | 2/2004 | Sauler et al. ................ | 701/111 |
| 2005/0000272 | A1 * | 1/2005 | Takemura et al. ......... | 73/35.01 |
| 2005/0241369 | A1 * | 11/2005 | Inoue et al. ................ | 73/35.09 |

FOREIGN PATENT DOCUMENTS

JP    3-74571 A    3/1991

* cited by examiner

Primary Examiner—Eric S. McCall
(74) Attorney, Agent, or Firm—Sughrue Mion, PLLC

(57) ABSTRACT

A control device for an internal combustion engine comprising: a knocking sensor for detecting a knocking signal of the internal combustion engine; a band pass filter for extracting a knocking signal of a predetermined frequency band from the output signal of the knocking sensor; a high pass filter comprising a capacitor and a resistor for extracting an AC component from the output of the band pass filter; a rectifying circuit having a one-way conducting element and a resistor for achieving positive half waves from the AC output of the high pass filter; and a peak hold circuit for detecting a peak value from positive half wave pulses output from the rectifying circuit, holding the peak value for a predetermined time and outputting the peak value to ignition timing control, wherein the one-way conducting element of the rectifying circuit is constructed as a negative voltage clipping mechanism for achieving positive half waves by short-circuiting negative half waves, and also with respect to each of the circuit elements constituting the high pass filter and the rectifying circuit, each constant thereof is set so that the charging time constant and the discharging time constant to the capacitor are equal to each other.

3 Claims, 3 Drawing Sheets

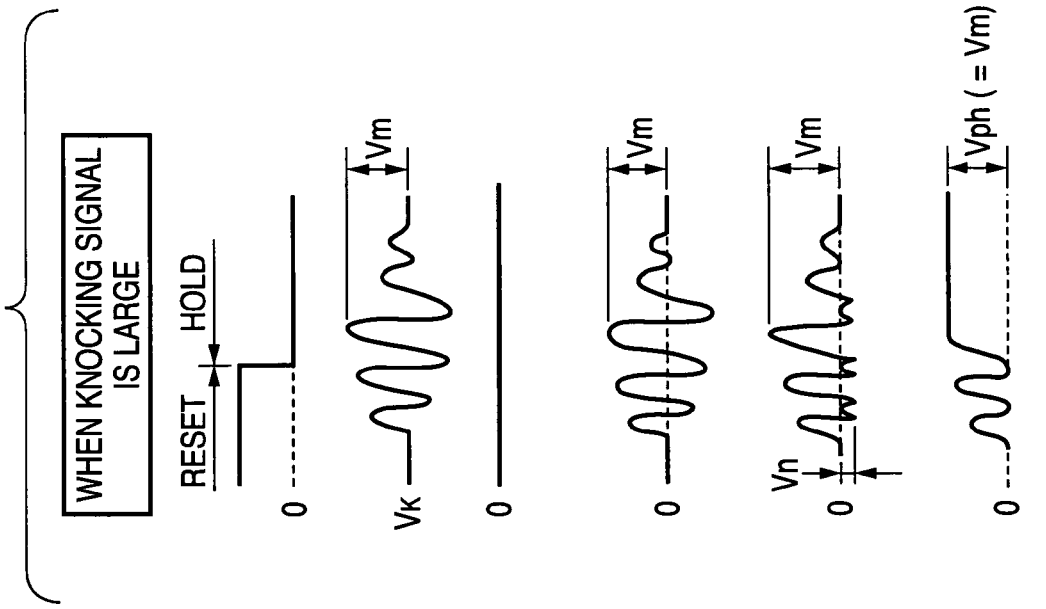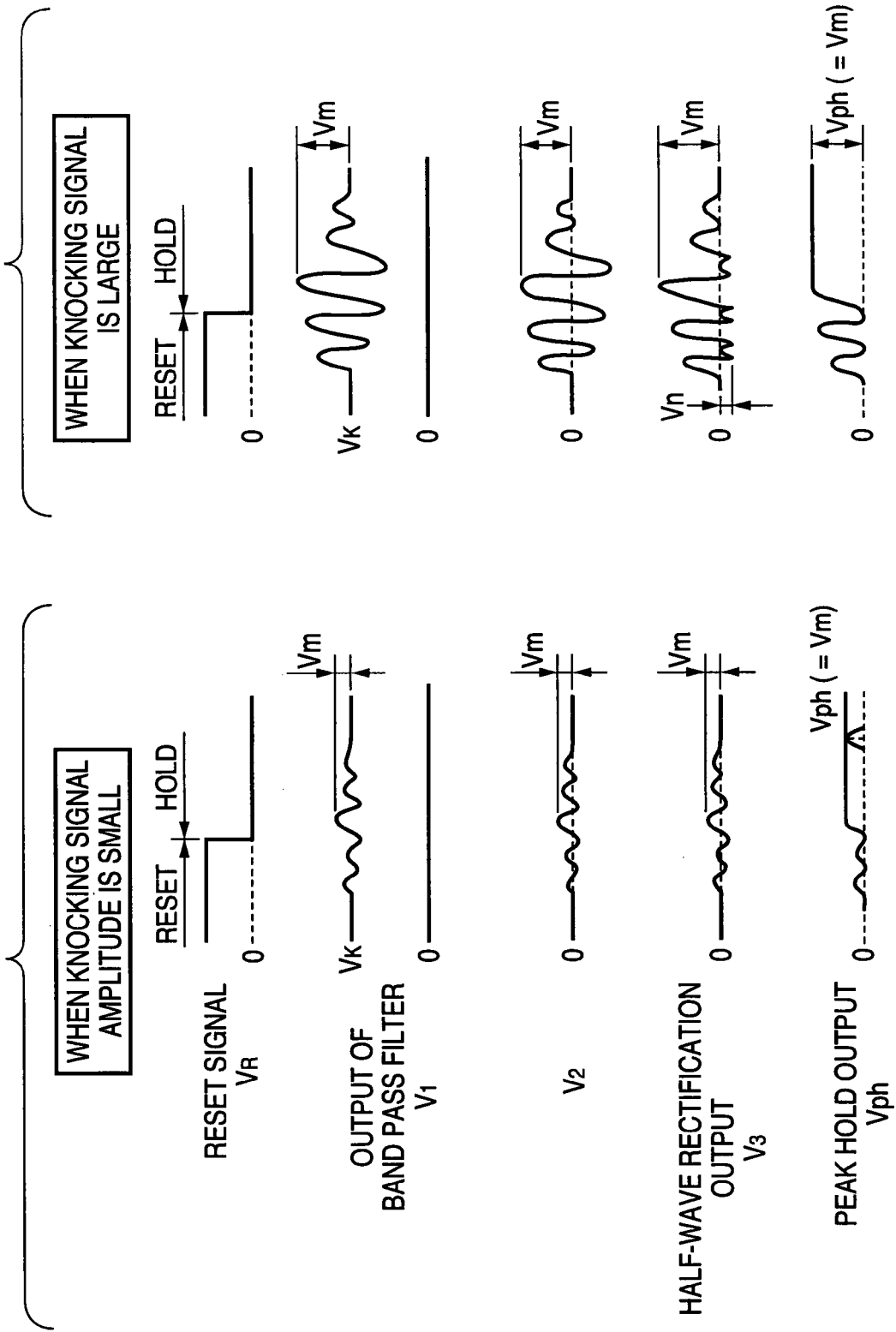

CONTROL DEVICE FOR INTERNAL COMBUSTION ENGINE

BACKGROUND OF THE INVENTION

1. Field of the Invention

The present invention relates to a control device for an internal combustion engine which carries out ignition timing control by detecting knocking of an internal combustion engine and can enhance knocking detection precision.

2. Description of the Related Art

An internal combustion engine for a vehicle is equipped with a knocking control device for controlling an ignition timing by detecting knocking, thereby enhancing fuel consumption, performance, etc. A generally used knocking control device comprises a band pass filter for extracting a specific knocking frequency from vibration frequencies detected by a knocking sensor, a high pass filter for extracting only AC components from the output of the band pass filter, a negative voltage clipping bias circuit for extracting positive half waves by superposing a bias voltage on the output of the high pass filter, an amplifying circuit for amplifying the positive half waves thus biased, a peak hold circuit for holding the peak value of the half wave voltage thus amplified for a predetermined time, and it is used to preventing malfunction and breakdown of an operation amplifier used in the amplifying circuit.

For example, there will be described the operation and characteristics of the generally used knocking control device thus constructed when the internal combustion engine is rotated at a low velocity. The band pass filter extracts a specific frequency component from the output of the knocking sensor and outputs an AC voltage proportional to a knocking signal. When the peak value of the voltage thus output is represented by Vm and a biasing DC output voltage generated by the negative voltage clipping bias circuit is represented by Ve, a voltage held by the peak hold circuit is equal to Vm+Ve, and thus the knocking control is carried out on the basis of this voltage. However, the actual knocking signal is equal to Vm, and thus the bias voltage Ve set for the purpose of protecting the amplifying circuit serves as an error to the knocking signal.

When the internal combustion engine is rotated at a high speed, the amplitude of the knocking signal is large. However, with respect to the time constant which is formed on the circuit construction, the difference in time constant between the charging operation and the discharging operation appears remarkable in a high pass filter comprising a CR circuit of a capacitor and a resistor. The unbalance of the time constant as described above occurs because a reverse blocking diode provided to the negative voltage clipping bias circuit varies the circuit constants of the charging circuit and the discharging circuit to the capacitor of the capacitor. This variation acts so that the charging time constant is larger than the discharging time constant, and the capacitance terminal voltage of the high pass filter is shifted in parallel toward the positive voltage side with respect to the earth voltage. As a result, a peak voltage Vma higher than the actual knocking signal Vm is output, and further this voltage is added with the DC output voltage Ve of the negative voltage clipping bias circuit. Therefore, the voltage held by the peak hold circuit is equal to Vma+Ve, and thus the error is enlarged. This error is increased as the knocking signal is large, in other words, as the rotational number is increased.

In the conventional generally-used knocking control device, the error based on the DC output voltage Ve of the negative voltage clipping bias circuit and the error based on the unbalance of the charging and discharging time constants in the high pass filter are added with each other, and thus a normal peak hold voltage to the knocking signal cannot be achieved, so that the ignition time control cannot be performed with high precision. Furthermore, the bias voltage Ve and the error based on the unbalance of the charging and discharging time constants shift the peak hold voltage to the high voltage side. Therefore, as described later, the knocking signal voltage reaches a predetermined voltage determined by a power source voltage under a relatively low rotation speed, and the knocking signal is clipped to the predetermined voltage, so that the dynamic range is narrowed.

SUMMARY OF THE INVENTION

The invention has been implemented in view of the foregoing situation, and has an object to provide a control device for an internal combustion engine which has a broad dynamic range to knocking control and can carry out ignition timing control with high precision.

In order to attain the above object, a control device for an internal combustion engine is equipped with a knocking sensor for detecting a knocking signal of the internal combustion engine, a band pass filter for extracting a knocking signal of a predetermined frequency band from the output signal of the knocking sensor, a high pass filter comprising a capacitor and a resistor for extracting an AC component from the output of the band pass filter, a rectifying circuit having a one-way conducting element and a resistor for achieving positive half waves from the AC output of the high pass filter, and a peak hold circuit for detecting a peak value from positive half wave pulses output from the rectifying circuit, holding the peak value for a predetermined time and outputting the peak value to ignition timing control means, wherein the one-way conducting element of the rectifying circuit is constructed as a negative voltage clipping means for achieving positive half waves by short-circuiting negative half waves, and also with respect to each of the circuit elements constituting the high pass filter and the rectifying circuit, each constant thereof is set so that the charging time constant and the discharging time constant to the capacitor are equal to each other.

According to the control device for the internal combustion engine of the invention, the negative voltage clipping means for protecting an operational amplifier and a peak hold circuit without applying a bias voltage is used, and also the circuit constant is set so that the charging time constant and the discharging time constant to the capacitor are equal to each other. Therefore, the error of the holding voltage of the peak hold circuit to the knocking signal can be suppressed to the lowest value, and the precision of the ignition control timing to the knocking signal can be enhanced.

BRIEF DESCRIPTION OF THE DRAWINGS

FIGS. 4A and 4B are time charts showing the operation of the internal combustion engine control device according to the first embodiment of the invention.

DETAILED DESCRIPTION OF THE PREFERRED EMBODIMENTS

A preferred embodiment according to the invention will be described hereunder with reference to the accompanying drawings.

[First Embodiment]

Figure 1:
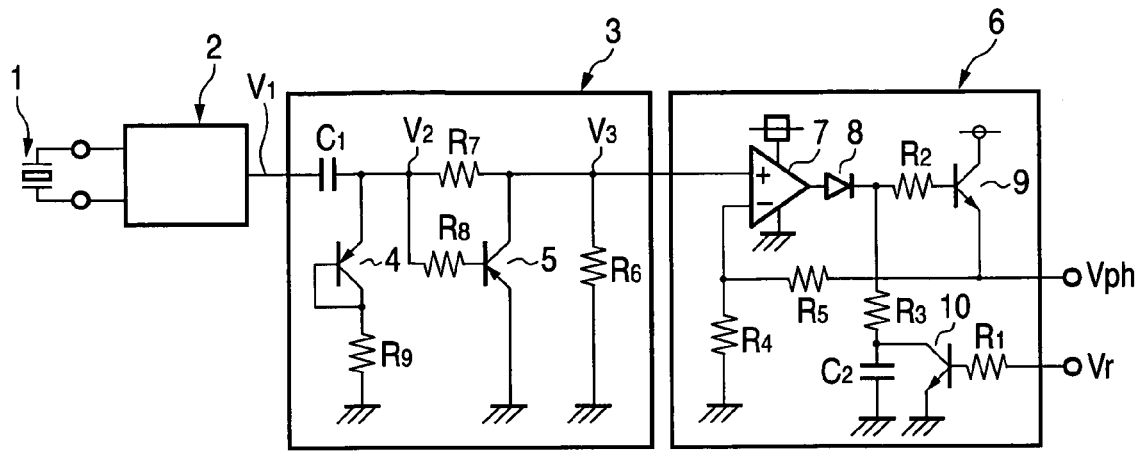
FIG. 1 is a diagram showing a circuit for detecting a knocking signal of an internal combustion engine control device according to a first embodiment of the invention.
Figure 2:
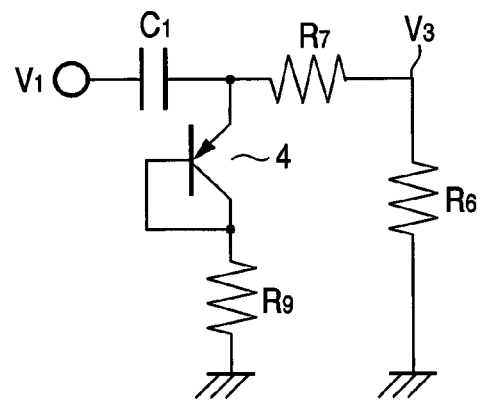
FIG. 2 is an equivalent circuit diagram for the operation of the internal combustion engine control device according to the first embodiment of the invention.
Figure 3:
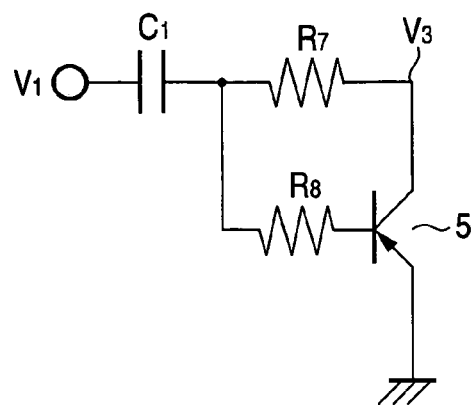
FIG. 3 is an equivalent circuit diagram for the operation of the internal combustion engine control device according to the first embodiment of the invention.
Figure 5:
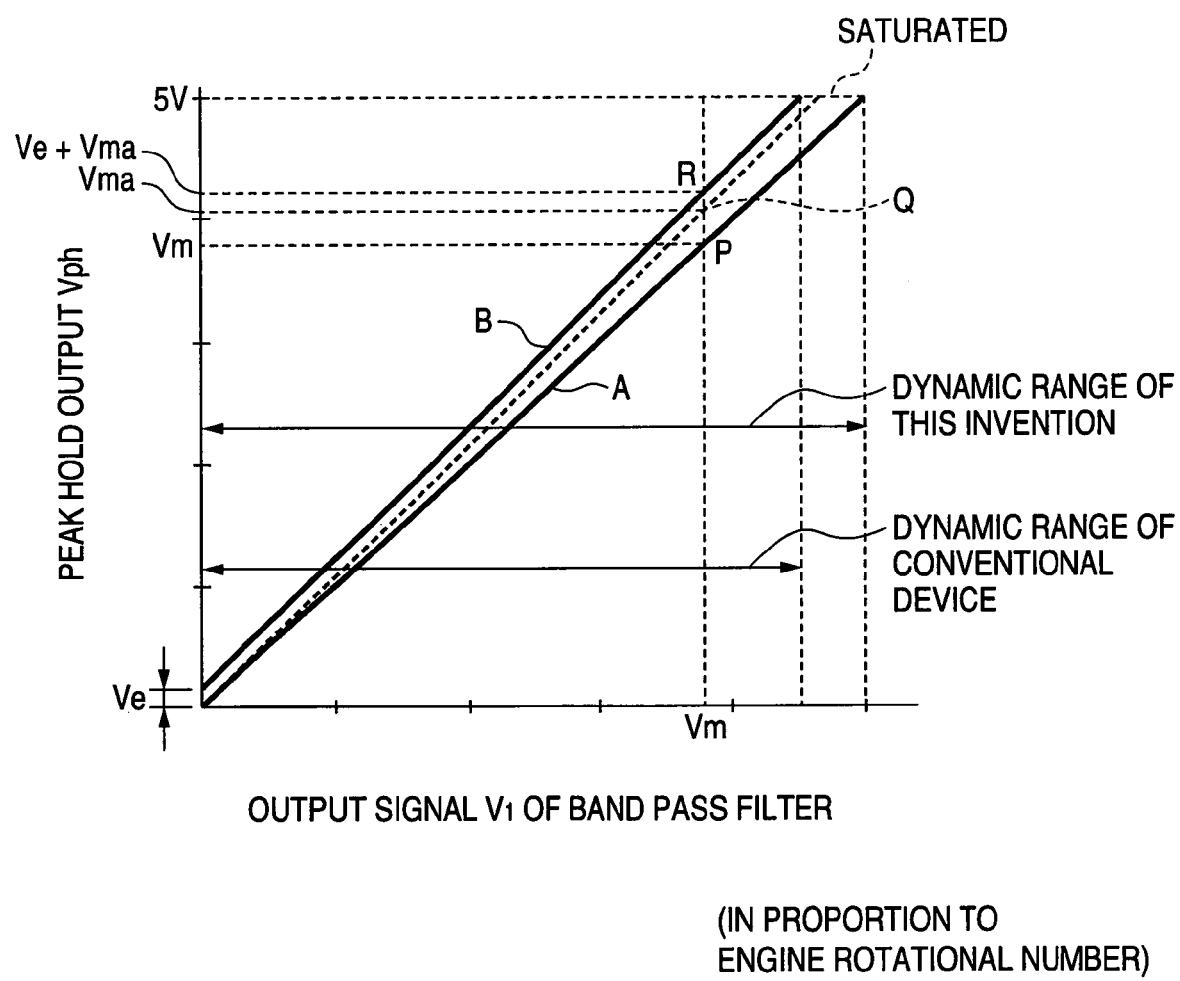
FIG. 5 is a characteristic diagram showing an effect of the internal combustion engine control device according to the first embodiment of the invention.

FIGS. 1 to 5 show an internal combustion engine control device according to a first embodiment of the invention. FIG. 1 is a circuit diagram for knocking detection, FIGS. 2 and 3 are partial circuit diagrams which are equivalently extracted from FIG. 1 to describe the operation, FIG. 4 is a time chart showing the waveform to describe the operation, and FIG. 5 is a characteristic diagram showing the state of the effect as compared with a conventional internal combustion engine control device.

In the knocking detecting circuit diagram of FIG. 1, the knocking sensor 1 is provided to the internal combustion engine (not shown), and outputs as a voltage signal vibration caused by knocking, and the output signal of the knocking sensor 1 is supplied to a rectifying circuit 3 comprising a high pass filter and a negative voltage clip circuit through a band pass filter 2 for extracting a predetermined frequency component. The rectifying circuit 3 comprises a capacitor C1, transistors 4 and 5 serving as a one-way conducting element and resistors R6, R7, R8, R9. The high pass filter is constructed by these elements, and the negative voltage clip circuit (means) is constructed by the transistor 5 and the resistors R6, R7 and R8. The negative voltage clip circuit sets V3 of the figures to positive half waves by short-circuiting negative half waves having a predetermined voltage or more, and it prevents malfunction and breakdown of a peak hold circuit 6 and an operational amplifier 7 described later without needing a DC bias Ve described with reference to the conventional internal combustion engine control device.

A signal voltage V3 processed in the rectifying circuit 3 is supplied to the peak hold circuit 6. The peak hold circuit 6 is a hybrid circuit containing an amplifying circuit comprising an operational amplifier 7, a diode 8, a transistor 9, a resistor R2, a resistor R4 and a resistor R5, and a hold circuit comprising a capacitor C2, a transistor 10 and resistors R1 and R3. The amplifying circuit amplifies the output signal voltage V3 of the rectifying circuit 3, and the hold circuit holds the amplitude peak value of the amplified output signal from the rectifying circuit 3 for a predetermined time and outputs it to ignition timing control means (not shown).

The operation of the internal combustion engine control device according to the first embodiment thus constructed will be described with reference to FIGS. 2 to 4B.

FIG. 4A is a time chart showing waveforms under a low-speed rotation state where the amplitude level of the knocking signal is small, and FIG. 4B is a time chart showing waveforms under a high-speed rotation state where the amplitude level of the knocking signal is large. The respective waveforms correspond to waveforms of voltages V1, V2, V3, Vr and Vph shown in FIGS. 1 to 3.

First, the low speed rotation state under which the amplitude level of the knocking signal of FIG. 4A is small will be described. A DC component is superposed on the output signal V1 of the band pass filter 2, however, the DC component is first removed by the capacitor C1 to achieve an AC component voltage V2. Under the low speed rotation state where the amplitude of the knocking signal is small, the transistors 4 and 5 of the rectifying circuit 3 do not enter the active region, and thus the high pass filter is constructed by only the capacitor C1 and the resistors R6 and R7. Therefore, representing the time constant at the charging time by τa1 and representing the time constant at the discharging time by τa2, $$\tau a1 = \tau a2 = C1 \times (R6+R7) \quad (1)$$

Accordingly, the time constants at the charging and discharging times are identical to each other.

Accordingly, with respect to the waveform of the voltage V2, the center of the waveform keeps 0 potential (ground potential) as shown in FIG. 4A. Furthermore, there is no DC bias as described with respect to the conventional internal combustion engine control device. Therefore, with respect to the output voltage V3 of the rectifying circuit 3, the center value of the waveform is set to the ground potential, and thus an AC component voltage peak value Vm proportional to the knocking signal is directly output, so that an output value having no error is achieved as an output Vph of the peak hold circuit 6. The transistor 10 is turned off at the same time when the knocking signal is input, thereby holding the voltage Vph based on the knocking signal in the capacitor C2, and after a predetermined time elapses, the transistor 10 is turned on to reset the voltage Vph of the capacitor C2.

Even in the high speed rotation state where the amplitude level of the knocking signal is large, the error caused by the shift of the voltage described with reference to the conventional internal combustion engine control device can be prevented from being enlarged if the time constant at the charging time and the time constant at the discharging time are equal to each other. Therefore, in this embodiment, the constant of the rectifying circuit 3 is set as described below.

That is, FIG. 2 shows a state where the amplitude level of the knocking signal is large, and it shows an equivalent circuit of the high pass filter at the charging time. At the charting time, the transistor 5 is added with an inverse bias and thus set to a shut-off state. Therefore, the circuit achieved by removing the transistor 5 and the resistor R8 from the rectifying circuit 3 of FIG. 1 becomes an equivalent circuit of FIG. 2. At this time, the equivalent resistance Rf at the charging time is represented as follows.

$$Rf = [Veb/\{Is\ EXP(qveb/KT)\} + R9] // (R6+R7) \quad (2)$$

Here,

Veb represents the voltage between the emitter and base of the transistor 4, K represents the Boltzmann constant; $1.38 \times 10^{-23}$ joule/K Q represents charge of electron; $1.6 \times 10^{-19}$ C T represents the absolute temperature (° K.)

For T=300° K., q/KT=38.65, Is=$3 \times 10^{-14}$ (A)

Furthermore, the amplitude level of the knocking signal is large, and the equivalent circuit of the high pass filter at the discharging time is shown in FIG. 3. At the discharging time, the transistor 4 is fed with an inverse bias and thus set to a shut-off state. Therefore, the circuit achieved by removing the transistor 4 and the resistor R9 and also the resistor R6 (because the transistor 5 is conducted) from the rectifying circuit 3 of FIG. 1 becomes the equivalent circuit of FIG. 3. The equivalent resistance Rr at the discharging time is represented as follows.

$$Rr = [Veb/\{Is\ EXP(qVeb/KT)\} + R8] // R7 \quad (3)$$

Here, Veb represents the voltage between the emitter and base of the transistor 5, and the other constants are the same as the equation (2).

In order to equalize the time constant at the charging time and the time constant at the discharging time to each other, the equivalent resistance Rf at the charting time and the equivalent resistance Rr at the discharging time may be set to equal to each other, and the respective resistance values of the resistors R6, R7, R8 and R9 are set so that the equation (2) and the equation (3) are equal to each other. For example, when R9 is set to 10KΩ and Veb is set to 0.55V, by setting R6=R7=R8=R and calculating the value of R from Rf=Rr, R=20.4KΩ.

FIG. 4B shows the V2 waveform to the output voltage waveform V1 of the band pass filter 2, the output waveform V3 of the rectifying circuit 3 and the output waveform Vph of the peak hold circuit 6 under the condition as described above. Since the charging time constant and the discharging time constant are set to be equal to each other, the center of the waveform of the voltage V2 keeps 0 potential (ground potential), and the center value of the waveform of the output voltage V3 of the rectifying circuit 3 is equal to the ground potential because there is no DC bias. Therefore, the AC component pulse high value Vm proportional to the knocking signal is directly output, and an output value having no error is achieved as an output Vph of the peak hold circuit 6.

FIG. 5 shows the characteristics as described above, and shows a comparison result of the characteristics of the output voltage Vph of the peak hold circuit 6 to the output voltage V1 of the band pass filter 2 proportional to the knocking signal between the invention and the conventional internal combustion engine control device. The characteristic B of FIG. 5 shows the characteristic of the conventional device described above. As described above, the time constant at the charging time is not coincident with the time constant at the discharging time, and thus when the value of the output voltage V1 of the band pass filter 2 is equal to Vm, the output voltage Vph of the peak hold circuit 6 is equal to the value Vma at Q point on the characteristics indicated by a broken line. Furthermore, it is added with a DC bias and thus equal to Vma+Ve at R point on the characteristic B. Therefore, a difference occurs between (Vma+Ve) and Vm on the Y-axis line of FIG. 5, and this difference corresponds to the error.

On the other hand, in the internal combustion engine control device according to the first embodiment of the invention, the malfunction and the breakdown can be prevented without using any DC bias voltage as described above, and the constants are set so that the charging time constant and the discharging time constant are equal to each other. Therefore, as shown in the characteristic A of FIG. 5, when the value of the output voltage V1 of the band pass filter 2 is equal to Vm, the output voltage Vph of the peak hold circuit 6 is set to the P point on the characteristic A, that is, Vm. Therefore, if the value of V1 is within a predetermined range, no error occurs in the voltage Vph, and there is neither non-coincidence between the charging time constant and the discharging time constant nor DC bias. Therefore, as indicated by the difference between the characteristic A and the characteristic B, the dynamic range of the knocking control is enlarged.

The operation of the negative voltage clip of the rectifying circuit 3 is as follows.

When the negative wave of the voltage V2 exceeds −0.5V in FIG. 1 and FIG. 4A, the transistor is turned on, and the negative wave side of the voltage V3 is clipped to Vn as shown in FIG. 4B. The value of Vn at this time is equal to −0.25V if R6=R7, and thus the malfunction and the breakdown of the operational amplifier 7 and the hold circuit can be prevented. The transistor 4 is provided so that the equivalent resistance Rf at the charging time and the equivalent resistance Rr at the discharging time are made coincident with each other while counting in the temperature characteristic, and it is used for temperature compensation based on the same characteristic as the transistor 5 and also for the reverse blocking.

What is claimed is:

1. A control device for an internal combustion engine comprising:
    a knocking sensor for detecting a knocking signal of the internal combustion engine;
    a band pass filter for extracting a knocking signal of a predetermined frequency band from the output signal of the knocking sensor;
    a high pass filter comprising a capacitor and a resistor for extracting an AC component from the output of the band pass filter;
    a rectifying circuit having a one-way conducting element and a resistor for achieving positive half waves from the AC output of the high pass filter; and
    a peak hold circuit for detecting a peak value from positive half wave pulses output from the rectifying circuit, holding the peak value for a predetermined time and outputting the peak value to ignition timing control means, wherein the one-way conducting element of the rectifying circuit is constructed as a negative voltage clipping means for achieving positive half waves by short-circuiting negative half waves, and also with respect to each of the circuit elements constituting the high pass filter and the rectifying circuit, each constant thereof is set so that the charging time constant and the discharging time constant to the capacitor are equal to each other.

2. The internal combustion engine control device according to claim 1, wherein the one-way conducting element of the rectifying circuit is equipped in a discharging direction to a discharging circuit to the capacitor of the high pass filter, a second one-way conducting element is equipped in a charging direction from the band pass filter to a charging circuit to the capacitor, and the temperature characteristic of the one-way conducting element and the temperature characteristic of the second one-way conducting element are set to be substantially equal to each other.

3. The internal combustion engine control device according to claim 2, wherein each of the one-way conducting element and the second one-way conducting element is constructed by a transistor.

* * * * *